May 1, 1934.  K. E. BEMIS  1,956,888
NONDRIP LIQUID DISPENSER
Filed Oct. 6, 1933
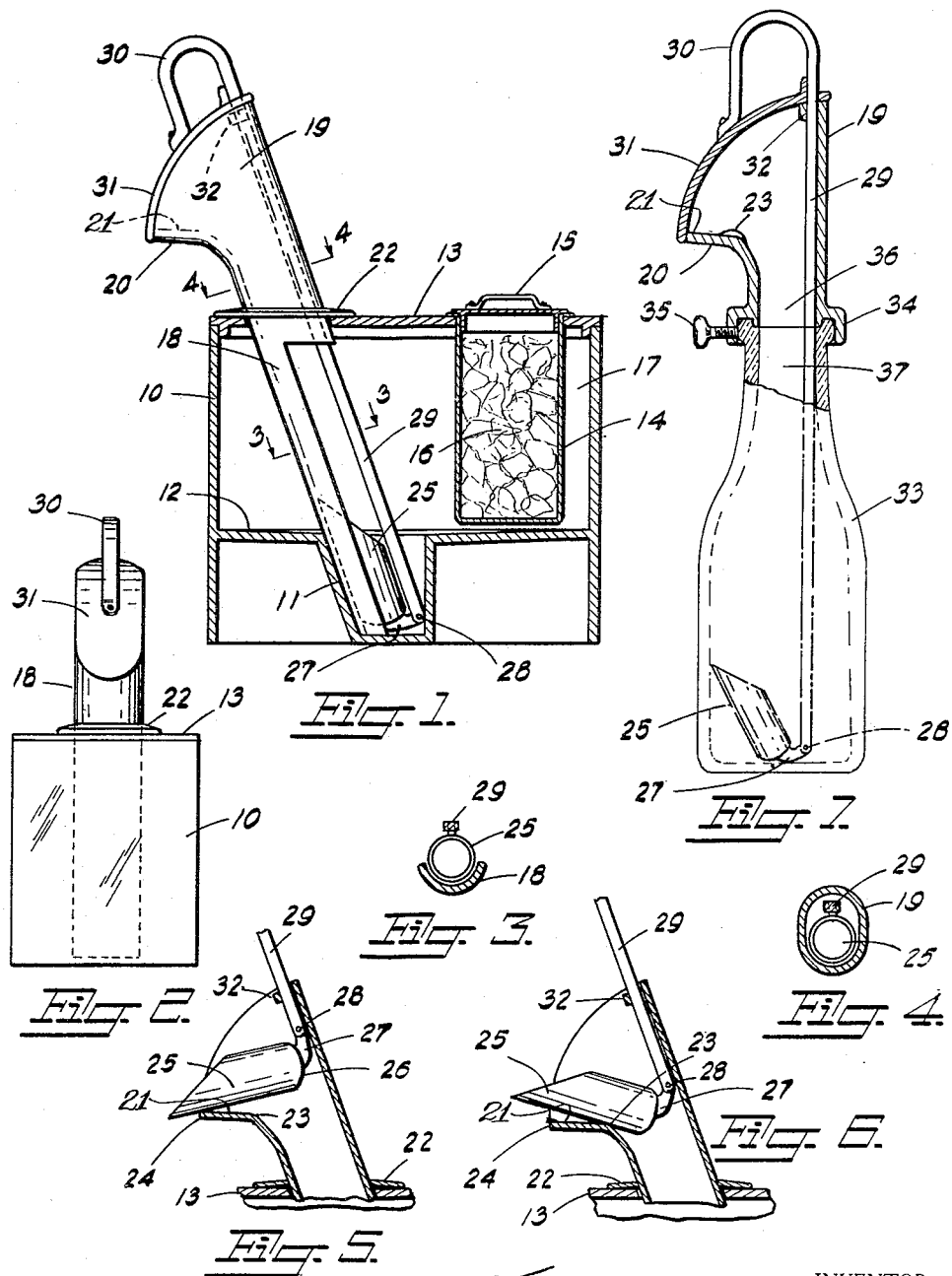
INVENTOR.

Patented May 1, 1934

1,956,888

UNITED STATES PATENT OFFICE 1,956,888

NONDRIP LIQUID DISPENSER

Kenneth E. Bemis, San Francisco, Calif.

Application October 6, 1933, Serial No. 692,465

12 Claims. (Cl. 221—97)

This invention is a liquid dispenser, and particularly, a non-drip cream dispenser, for use in dispensing accurately measured quantities of cream for coffee.

Liquid dispensers of the types in common usage permit considerable dripping of liquids each time the liquid is dispensed. With my invention, there is no possibility of dripping or contamination, inasmuch as the liquid at the edge of the lip is actually lifted away therefrom, and the lip is maintained sealed at all times except at the time the liquid is dispensed.

The main object of my invention, therefore, is to provide a cream dispenser which will measure and dispense accurate quantities of liquid, and dispense the liquid without any after-drip.

Another object of the invention is to provide the dispenser with a lip which merely functions as a guide for the dispensing receptacle and a drain-back for the liquid adhering to the outer surface of the receptacle.

A further object of the invention is to provide a dispensing receptacle of the lifting type, and to dispense the liquid directly from the receptacle into the cup or other receiver, so that at no time will cream be poured over a surface on which cream has been previously deposited.

Other objects and advantages of the invention will become apparent as the following description is read on the drawing forming a part of this specification, and in which similar reference characters are used to designate similar parts throughout the several views, of which;

Fig. 1 is a longitudinal sectional elevation through my invention.

Fig. 2 is a front view of Fig. 1 drawn to a reduced scale.

Fig. 3 is a section taken on line 3—3 of Fig. 1.

Fig. 4 is a section taken on line 4—4 of Fig. 1.

Fig. 5 is a fragmentary sectional view showing the dispensing receptacle discharging its contents beyond the edge of the lip.

Fig. 6 is a view similar to Fig. 5 except with the receptacle tilted upwardly away from the edge of the lip to capillarily attract the liquid from the edge of the lip.

Fig. 7 is a part sectional view showing my invention applied to an ordinary milk bottle.

The invention consists of a container 10 of either circular or non-circular form, having a well or drain-pocket 11 formed in the bottom 12, the bottom being preferably slightly sloped toward the pocket, the purpose of which is to permit dispensing of substantially all of the liquid from the container.

A cover 13 is removably fitted to the container and has, removably supported therein, a refrigerant container 14 which is provided with a removable cover 15, the container being filled with a refrigerant 16, the refrigerant container projecting downwardly into the cream or other fluid 17.

Removably mounted and frictionally retained in the cover 13 is a guide 18 terminating at its upper end in a head 19 and in an arcuately formed lip 20 which has a constant back-drain surface 21 for the purpose of draining any liquid reaching the lip back into the container 10. The projecting portion of the guide, or head 19, is formed as a complete enclosure, while the portion below the cover 13 consists only of a half-housing, or guide of semi-circular form as specifically shown in Fig. 3. A collar 22 is formed integral with, or secured to the head portion 19 and seats on the cover 13.

A feature of main importance is the shape of the lip and which must include a fulcrum which is particularly accentuated in the drawing at 23, and without which the non-drip feature is unobtainable. This fulcrum is located away from the edge of the lip 24 and acts as a fulcrum about which the dispensing receptacle swings to meet and recede from the edge of the lip. This fulcrum may be formed as a raised portion on the curved surface as shown in Fig. 7, but is preferably formed by properly designing the arcuate surface so that the rolling action of the receptacle is interrupted at a given point and changes to a tipping action to the edge of the lip, leaving a slight clearance between the receptacle and the lip from the edge of the lip to the fulcrum. The proper curve is of irregular form as shown in Figs. 5 and 6.

The dispensing receptacle 25 is preferably cylindrical in form with a spheroidal bottom 26. Integral with the bottom is an arm 27 which is pivoted at 28 to the lifting device 29. This eccentric pivoting or sub-lateral support for the receptacle 25 permits the receptacle to tip and dump its contents when the receptacle is not retained in upright position by the guide and, for this reason, the receptacle gravitationally tips outwardly when the lip 20 is reached and fulcrums about the surface 23, dropping down to the edge of the lip to discharge its contents directly into a receiver or coffee cup, the initial return movement of the receptacle first raising the forward end of the receptacle away from the edge of the lip as shown in Fig. 6, and causing capillary action to draw the liquid from the edge of the lip back onto the lip, from whence it is drained back into the container.

The lifting device consists of the lifter rod 29 terminating at its upper end in a handle 30, which is secured to the lip cover 31, whereby the cover 31 is automatically raised when cream is to be dispensed, and closed as the dispensing receptacle 25 is permitted to gravitationally return to the well 11. An eye 32 forming a guide and stop member for the rod 29, is integral with the rear wall of the head 19 and cooperates with the arm 27 to limit the upward movement of the receptacle.

As shown in Fig. 7, the invention may readily be adapted for installation in any style of container. In this case, the wall of the milk bottle 33 forms the guide, the balance of the structure being similar to that previously described except that of forming the lip to suit the angularity of mounting. Where a special container 10 is used, the dispenser is preferably mounted in angular relation to the vertical, as shown in Fig. 1, although the results are identical irrespective of the angularity, when the shape of the lip is properly formed.

It will be noted that the receptacle 25, when being raised, is retained in upright position until the lip is reached, when further upward movement of the lifting device causes the receptacle to be projected forwardly, scraping the adhering cream from the surface of the receptacle, the final upward movement of the lifting device tilting the receptacle about the fulcrum, and touching the edge of the lip as the arm 27 reaches the stop 32. The initial downward movement of the lifting device first tilts the receptacle away from the edge of the lip causing capillary action from the edge of the lip toward the fulcrum, thus drawing the cream from the edge of the lip, and preventing dripping of cream from the edge of the lip.

It will also be noted that the cover 31 completely closes the lip and prevents insects or contaminating substances from reaching any cream-contacting portion of the apparatus.

When the device is to be installed in cream bottles or similar containers, a suitable integral enclosing collar 34 is provided with securing means 35, the bore 36 of the head 19 being coextensive with the bore 37 of the container 33, so as to provide a continuous guide surface for the top edge of the receptacle.

From the above description it will be realized that there is no possibility of dripping, and that all cream contacting surfaces drain directly into the container, and that the cream is dispensed directly from the measuring device or receptacle 25 into the receiver or cup, and that the cream when dispensed does not come in contact with any interposed surface or device.

It will be understood that variations in construction, form, and arrangement of parts, which are consistent with the appended claims may be resorted to without detracting from the spirit or scope of the invention or sacrificing any of the advantages thereof.

I claim:

1. Means for preventing dripping of liquid from a dispensing device comprising a guide terminating at its upper end in an arcuately formed lip having a back-drain surface throughout its extent, an eccentrically pivoted dispensing receptacle retained in upright position by the lower portion of the guide and tipping outwardly on entering the lip, lifting means for the dispensing device, said lip having a fulcrum portion for raising the outer portion of the receptacle away from the edge of the lip with the initial return movement of the lifting means, whereby liquid is capillarily drawn from the edge of the lip, and dripping is obviated.

2. Means for preventing dripping of liquid from a dispensing device comprising a guide terminating at its upper end in an arcuately formed lip having a back-drain surface throughout its extent, an eccentrically pivoted dispensing receptacle retained in upright position by the lower portion of the guide and tipping outwardly on entering the lip, lifting means for the receptacle, said lip having a fulcrum portion for raising the outer portion of the receptacle away from the edge of the lip with the initial return movement of the lifting means, whereby liquid collected at the edge of the lip is capillarily drawn from the edge of the lip and dripping is obviated, and a closure for said lip integral with the lifting means.

3. A liquid dispenser comprising a container having a cover, a guide projecting above said cover and terminating at its upper end in a head having a back-drain lip, a tipping dispensing receptacle and lifting means therefor, a closure integral with the lifting means and a fulcrum formed in the lip for raising the forward end of the receptacle away from the edge of the lip coincidently with the initial return movement of the lifting means, whereby liquid is capillarily drawn from the edge of the lip and dripping therefrom is obviated.

4. A liquid dispenser comprising a container having a cover, a guide projecting above said cover and terminating in a back-drain lip, a tipping dispensing receptacle and lifting means therefor, a closure integral with the lifting means and a fulcrum formed in the lip for raising the forward end of the receptacle away from the lip coincidently with the initial return movement of the lifting means, whereby liquid is capillarily drawn from the edge of the lip and dripping is obviated, said guide being frictionally secured in said cover and having formed therein, a guide and stop for the lifting means.

5. A liquid dispenser comprising a container and a removable cover therefor, a guide extending upwardly through the cover and terminating in an arcuately formed lip having a back-drain surface and a fulcrum formed intermediate its length, hand actuated lifting means and guiding and stop means therefor, and a dispensing receptacle pivotally secured to the lifting means and retained in upright position by the guide, said receptacle tipping over the lip adjacent its upper terminus of travel and pivoting about the fulcrum whereby initial downward movement of the lifting means swings the receptacle away from the outer edge of the lip to capillarily attract the liquid from the outer edge of the lip to prevent drip.

6. A liquid dispenser comprising a container and a removable cover therefor, a guide extending upwardly through the cover and terminating in an arcuately formed lip having a back-drain surface and a fulcrum formed intermediate its length, hand actuated lifting means and guiding and stop means therefor, and a dispensing receptacle pivotally secured to the lifting means and retained in upright position by the guide, said receptacle tipping over the lip adjacent its upper terminus of travel and pivoting about the fulcrum whereby initial downward movement of the lifting means swings the receptacle away from the outer edge of the lip to capillarily attract the liquid from the outer edge of the lip to prevent drip, the pivotal securing means for the receptacle being sub-laterally located relative to the receptacle to permit tipping of the receptacle when not retained by the guide.

7. A liquid dispenser comprising a container and a removable cover therefor, a guide extending upwardly through the cover and terminating in an arcuately formed lip having a back-drain surface and a fulcrum formed by the surface intermediate its length, hand actuated lifting means and guiding and stop means therefor, and a dispensing receptacle pivotally secured to the lifting means and retained in upright position by the guide, said receptacle tipping over the lip adjacent its upper terminus of travel and pivoting about the fulcrum, whereby initial downward movement of the lifting means swings the receptacle away from the outer edge of the lip to capillarily attract the liquid from the outer edge of the lip to prevent drip, and a cover for the lip secured to the lifting means and operated coincidently therewith.

8. A liquid dispenser comprising a container and a removable cover therefor, a guide extending upwardly through the cover and terminating in an arcuately formed lip having a back-drain surface and a fulcrum formed on the surface intermediate its length, hand actuated lifting means and guiding and stop means therefor, and a dispensing receptacle pivotally secured to the lifting means and retained in upright position by the guide, said receptacle tipping over the lip adjacent its upper terminus of travel and pivoting about the fulcrum, whereby initial downward movement of the lifting means swings the receptacle away from the outer edge of the lip to capillarily attract the liquid from the outer edge of the lip to prevent drip, and a cover for the lip secured to the lifting means and operated coincidently therewith, the pivotal securing means for the receptacle being sublaterally located relative to the receptacle to permit tipping of the receptacle when not retained by the guide.

9. A liquid dispenser comprising a container and a removable cover therefor, a guide extending upwardly through the cover and terminating in an arcuately formed lip having a back-drain surface and a fulcrum formed intermediate its length, hand actuated lifting means and guiding and stop means therefor, and a dispensing receptacle pivotally secured to the lifting means and retained in upright position by the guide, said receptacle tipping over the lip adjacent its upper terminus of travel and pivoting about the fulcrum whereby initial downward movement of the lifting means swings the receptacle away from the outer edge of the lip to capillarily attract the liquid from the outer edge of the lip to prevent drip, said guide being frictionally secured in the cover and extending downwardly into a drain pocket formed in the bottom of the container.

10. A liquid dispenser comprising a container and a removable cover therefor, a guide extending upwardly through the cover and terminating in an arcuately formed lip having a back-drain surface and a fulcrum formed intermediate its length, hand actuated lifting means and guiding and stop means therefor, and a dispensing receptacle pivotally secured to the lifting means and retained in upright position by the guide, said receptacle tipping over the lip adjacent its upper terminus of travel and pivoting about the fulcrum whereby initial downward movement of the lifting means swings the receptacle away from the outer edge of the lip to capillarily attract the liquid from the outer edge of the lip to prevent drip, said guide being frictionally secured in the cover and extending downwardly into a drain pocket formed in the bottom of the container, the pivotal securing means for the receptacle being sub-laterally located relative to the receptacle to permit tipping of the receptacle when not retained by the guide.

11. A liquid dispenser comprising a container and a removable cover therefor, a guide extending upwardly through the cover and terminating in an arcuately formed lip having a back-drain surface and a fulcrum formed intermediate its length, hand actuated lifting means and guiding and stop means therefor, and a dispensing receptacle pivotally secured to the lifting means and retained in upright position by the guide, said receptacle tipping over the lip adjacent its upper terminus of travel and pivoting about the fulcrum whereby initial downward movement of the lifting means swings the receptacle away from the outer edge of the lip to capillarily attract the liquid from the outer edge of the lip to prevent drip, said guide being frictionally secured in the cover and extending downwardly into a drain pocket formed in the bottom of the container, the pivotal securing means for the receptacle being sub-laterally located relative to the receptacle to permit tipping of the receptacle when not retained by the guide, and, a cover for the lip secured to the lifting means and operated coincidently therewith.

12. A liquid dispenser comprising a container and a removable cover therefor, a guide extending upwardly through the cover and terminating in an arcuately formed lip having a back-drain surface and a fulcrum formed intermediate its length, hand actuated lifting means and guiding and stop means therefor, and a dispensing receptacle pivotally secured to the lifting means and retained in upright position by the guide, said receptacle tipping over the lip adjacent its upper terminus of travel and pivoting about the fulcrum whereby initial downward movement of the lifting means swings the receptacle away from the outer edge of the lip to capillarily attract the liquid from the outer edge of the lip to prevent drip, said guide being forwardly inclined to facilitate operation of the lifting means.

KENNETH E. BEMIS.